(12) United States Patent
Oliver

(10) Patent No.: US 6,662,492 B2
(45) Date of Patent: Dec. 16, 2003

(54) GARDEN MEMORIAL ARCH

(76) Inventor: Scottie James Oliver, 64 Mt. Cydonia Rd., Fayetteville, PA (US) 17222

( * ) Notice: Subject to any disclaimer, the term of this patent is extended or adjusted under 35 U.S.C. 154(b) by 0 days.

(21) Appl. No.: 10/082,299

(22) Filed: Feb. 26, 2002

(65) Prior Publication Data

US 2003/0159345 A1 Aug. 28, 2003

(51) Int. Cl.$^7$ .................................................. A01G 17/06
(52) U.S. Cl. ........................... 47/41.1; 47/45; 135/124
(58) Field of Search .......................... 47/41.1, 41.14, 47/44, 45, 46, 47; 248/27.8, 156; 135/124, 125, 114, 135; 52/86

(56) References Cited

U.S. PATENT DOCUMENTS

| | | | | |
|---|---|---|---|---|
| 199,353 A | * | 1/1878 | Clark | ........................ 47/45 |
| RE11,622 E | | 7/1897 | Warren et al. | |
| 834,672 A | * | 10/1906 | Hood | |
| 1,958,716 A | | 5/1934 | Roach et al. | |
| 2,011,990 A | * | 8/1935 | Aldridge | |
| 2,292,785 A | | 8/1942 | Henne | |
| 2,426,443 A | * | 8/1947 | Fetterman | ........................ 47/47 |
| D158,627 S | | 5/1950 | Thompson | |
| 2,774,186 A | | 12/1956 | Wilkins | |
| 3,136,510 A | | 6/1964 | Bowers et al. | |
| 3,195,898 A | | 7/1965 | Respini | |
| 3,422,829 A | * | 1/1969 | Adams, Jr. | |
| 3,526,068 A | * | 9/1970 | Buxton | ........................ 52/86 |
| 3,857,213 A | * | 12/1974 | Miyake | ........................ 52/86 |
| 3,871,607 A | * | 3/1975 | Pile | |
| 4,194,327 A | * | 3/1980 | Simone | ........................ 52/86 |
| 4,347,690 A | * | 9/1982 | Wallace, Jr. | ........................ 52/93.1 |
| 4,896,804 A | * | 1/1990 | Dearborn et al. | ........................ 224/153 |
| 5,353,570 A | | 10/1994 | Cooper, Jr. | |
| 5,595,203 A | * | 1/1997 | Espinosa | ........................ 135/124 |
| 5,647,660 A | | 7/1997 | Lee | |
| D402,431 S | * | 12/1998 | Peterson | |
| 5,862,625 A | * | 1/1999 | Parker | ........................ 47/47 |
| 5,913,477 A | * | 6/1999 | Dean | ........................ 239/289 |
| 6,112,756 A | * | 9/2000 | Tseng | ........................ 135/123 |
| 6,311,428 B1 | | 11/2001 | Marino et al. | |

FOREIGN PATENT DOCUMENTS

| | | | |
|---|---|---|---|
| DE | 20003353 U1 | * | 5/2000 |
| FR | 2605489 | | 4/1988 |
| GB | 2140356 A | * | 11/1984 |
| GB | 2315284 A | * | 1/1998 |
| JP | 11-303312 | * | 11/1999 |

* cited by examiner

*Primary Examiner*—Peter M. Poon
*Assistant Examiner*—Jeffrey L. Gellner
(74) *Attorney, Agent, or Firm*—Thomas E. Beall, Jr.

(57) ABSTRACT

A garden memorial arch floral material holder is installed in a cemetary with two ground penetrating stake assemblies and a flora holding assembly. The flora holding assembly comprises a plurality of rods connected in tandem and the rods have sufficient flexibility to elastically deform from an unstressed straight linear aspect to an arcuate aspect encompassing a semi-circular arch configuration, without permanent deformation. Rods of different length may be connected in different combinations to provide different arch assembly lengths. The rod connections have abutments limiting telescopic overlapping and friction detents to resist disconnection. Each of the two stake assemblies has a horizontal brace portion to be engaged by foot to force a stake portion into a cemetery ground, to engage the ground to limit the penetration, and to provide vertical alignment. The stake assemblies are in spaced apart parallel planes that are perpendicular to the arch assembly to stabilize the holder.

11 Claims, 2 Drawing Sheets

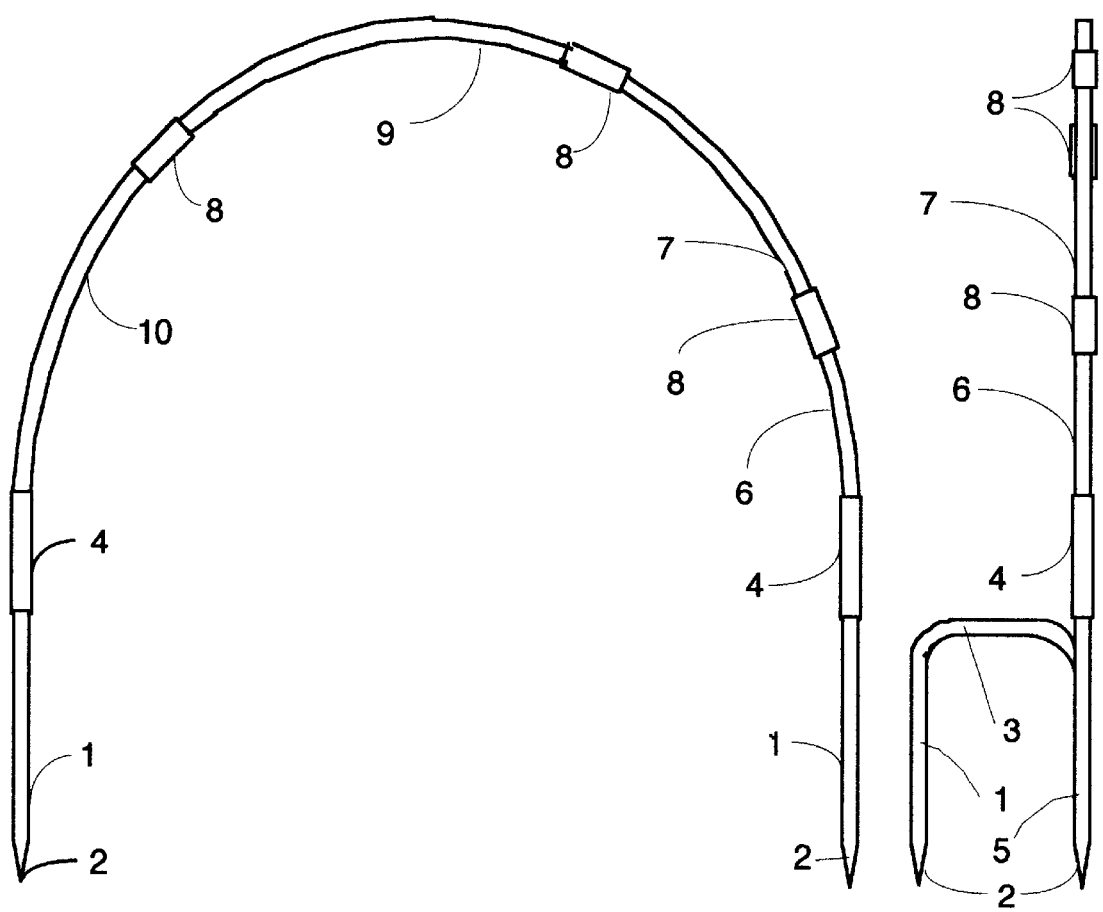
FIG. 1
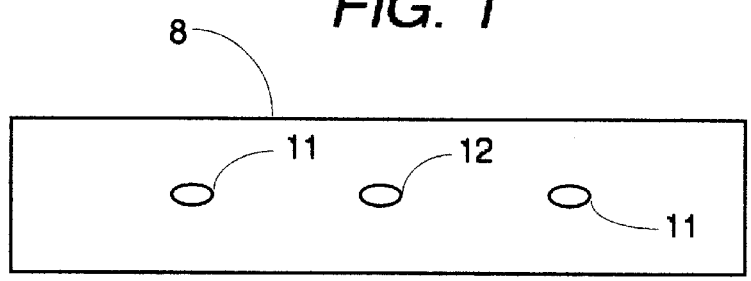
FIG. 3
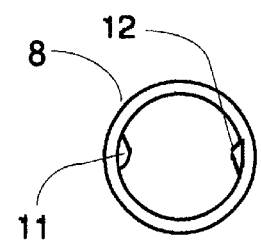
FIG. 2
FIG. 4

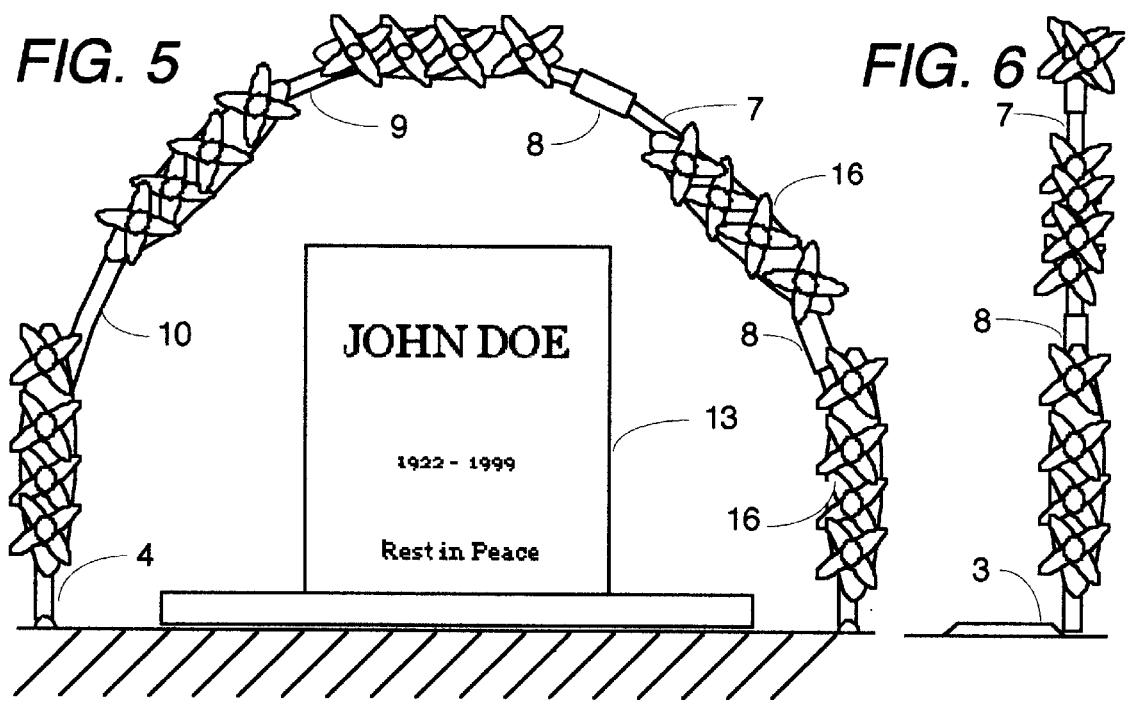
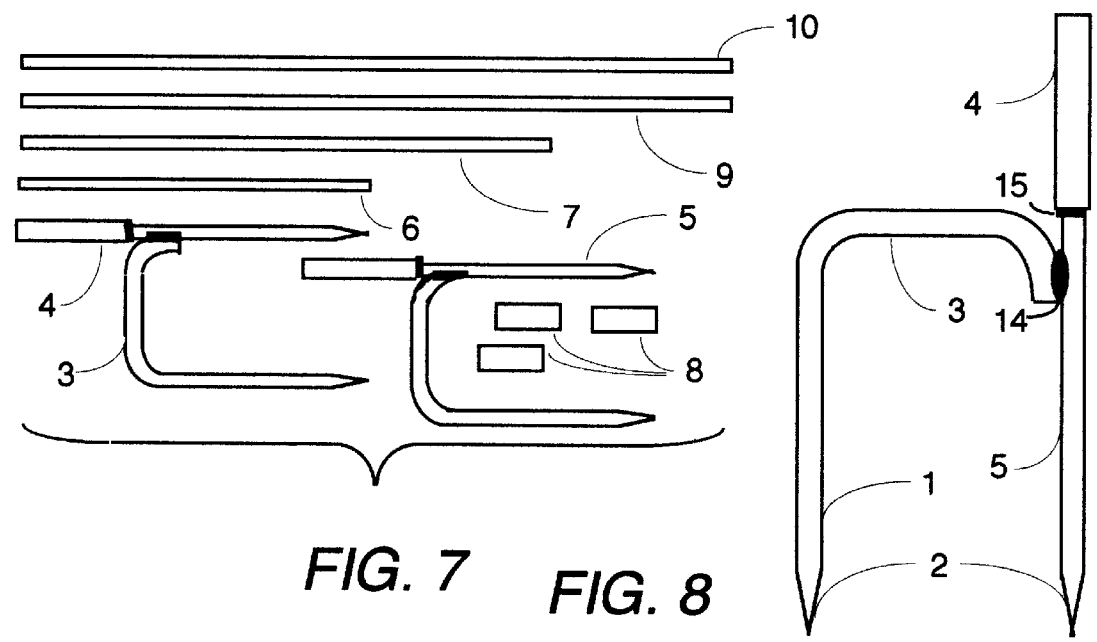

GARDEN MEMORIAL ARCH

BACKGROUND OF THE INVENTION

This invention relates to memorial floral holders or supports, particularly to a cemetary flower or plant material holder.

The patent to Bowers et al, U.S. Pat. No. 3,136,510, issued Jun. 9, 1964 is an example of a holder for a cemetary wreath. It is designed to be imbeded in the ground and hold a conventional circular wreath close to the ground. Another cemetary wreath holder is provided by Roach et al, U.S. Pat. No. 1,958,716, issued May 15, 1934. Roach et al is also designed to be imbeded in the ground and hold a conventional circular wreath close to the ground. They will obscure the marker engraving in many cases.

The patent to Wilkins, U.S. Pat. No. 2,774,186, issued Dec. 18, 1956, discloses a floral basket holder for funeral use and includes separate anchor pins to be driven into the ground. The basket is thereby held close to the ground, for outdoor use.

French 2605489 discloses a flowerpot holder having ground inserted legs. A horizontal bar 6 supports flowerpot holders 9,10. Grave markers ("Tombes" in French) are mentioned. The pots appear to be pinned to the ground.

SUMMARY OF THE INVENTION

The above mentioned patents disclose structure that is not suitable for holding general floral material at a gravesite. They are fixed in size and proportions so that they may not be adapted to different gravesites. Further, the structures of the above patents would not provide suitable ease of assembly and installation even if capable of being scaled or modified to hold general floral material. Packaging size and storage space are always important in a commercial product, and the above-mentioned prior art are not optimized for efficient packaging.

The present inventor has analyzed the above prior art to discover the above-mentioned problems, has identified and analyzed causes of the problems, and provided solutions to the problems. The discovery and analysis of the problems, the identification and analysis of the causes, and the provision of solutions are each parts of the present invention.

Therefore, the invention recognizes and analyzes a need to solve the above problems. The embodiment provides an efficiently packageable kit of parts that may be assembled and installed as a memorial floral holder without tools by an unskilled consumer and adjusted to aesthetically accomodate different sized memorials without obscuring engraving. When installed, the present embodiment provides a reliable structure that will hold up under the elements encountered at a cemetary, but yet be easily dissassembled and efficiently stored without permanent deformation.

The embodiment provides ground stakes that are easily inserted into the ground, have self aligning features and securely hold an arch assembly selectively composed of one or more flexible straight portions elastically bendable, and which straight portions are connected to each other and the ground stakes to provide different size arches to hold floral material thereon.

BRIEF DESCRIPTION OF THE DRAWING

The present invention is illustrated by way of example and not by way of limitation, in the figures of the accompanying drawing, in which like reference numerals refer to similar elements. Further objects, features and advantages of the present invention will become more clear from the following detailed description of a preferred embodiment and best mode of implementing the invention, as shown in the drawing, wherein:

FIG. 1 is a front elevational view of the garden memorial arch according to one embodiment of the invention;

FIG. 2 is a side elevational view of the garden memorial arch of FIG. 1, with the opposite side being a mirror image thereof;

FIG. 3 is an enlarged front elevational view of one of the connectors of FIGS. 1 and 2;

FIG. 4 is an end view of the connector of FIG. 3;

FIG. 5 is a front elevational view of the garden memorial arch according to FIG. 1, with flowers and other floral material attached, and with the garden memorial arch in place in a cemetary;

FIG. 6 is a side elevational view of the garden memorial arch of FIG. 5, with the opposite side being a mirror image thereof;

FIG. 7 is a side elevational view of a kit of the garden memorial arch components prior to being connected together and installed; and FIG. 8 is an end elevational view of the stake assembly, on an enlarged scale, prior to being connected with the arch assembly to obtain the garden memorial arch according to the embodiment of FIGS. 1 and 2.

DETAILED DESCRIPTION OF THE PREFERRED EMBODIMENT

In the following description, for the purposes of explanation, numerous specific details are set forth in order to provide a thorough understanding of the broader aspects of the present invention as well as to appreciate the advantages of the specific details themselves according to the more narrow aspects of the present invention. It is apparent, however, to one skilled in the art, that the broader aspects of the present invention may be practiced without these specific details or with an equivalent arrangement. Well-known structures and devices are not shown in extreme detail to avoid unnecessarily obscuring the present invention with unnecessary details of well known technology.

Still other aspects, features, and advantages of the present invention are readily apparent from the following detailed description illustrating a particular embodiment implementation, including the best mode contemplated by the inventor. The present invention is also capable of other and different embodiments, and its several details can be modified in various respects, all without departing from the spirit and scope of the present invention. The drawing and description are illustrative, and not restrictive.

A preferred embodiment of the garden memorial arch is shown assembled and installed in a cemetary with floral material attached, in FIG. 5. The components of the garden memorial arch, prior to assembly, are shown in FIG. 7; the components may all lie in a single plane as shown and therefore may be conveniently packaged, for example in a flat box, in a single layer or the components may be stacked in layers. The flexability of the arch portions and the knockdown nature of the construction provide easy packaging and storing.

Details of construction and assembly are described below with respect to the remaining figures.

The assembled garden memorial arch is shown in FIG. 1, prior to insertion into the ground at a cemetary and prior to the attachment of floral material. The stake assembly 1–5 is connected with the arch assembly 6–10 as shown in FIGS. 1 and 2.

There are two identical ground penetrating components, the stake assemblies 1–5, one of which is shown in an enlarged scale in FIG. 8 for illustrative purposes. A first vertical, ground penetrating, stake portion 1 has a terminal end 2, which is preferably sharpened or tapered to more easily penetrate the earth, and further has an opposite connection end. The opposite connection end is connected to a first horizontal brace portion 3. Preferably the brace portion 3 and the stake portion 1 are non-parallel, preferably at a right angle to each other, and rigidly connected together, preferably constructed as one homogeneous piece. Thereby, the brace portion 3 has a first connection end connected to a connection end of the first vertical stake portion 1 and further has a second connection end, which is preferable a portion bent downwardly at ninety degrees.

A second vertical, ground penetrating, stake portion 5 has a terminal end 2, which is preferably sharpened or tapered to more easily penetrate the earth, and further has an opposite connection end. The opposite connection end of the stake portion 5 is connected to the bent portion of the brace portion 3, preferably in a rigid manner, e.g. as a single homogeneous cast or molded, metal or plastic, piece (not shown), or as most preferred by welding 14 when the stake portion 1, brace portion 3 and stake portion 5 are constructed of solid steel rod, as shown. A tubular steel connector 4 is telescoped about one-half way over the upwardly extending opposite connection end of the stake portion 5 and then rigidly connected by the weld 15, which leaves the top of the tubular steel connector 4 upwardly opening as a connector to internally telescopically receive a flexible tube (6, 7, 9 or 10) as will be explained below.

According to another embodiment, a unitary homogeneous one piece stake assembly replaces each of the entire stake assembly 1–5, 14, 15 of FIG. 8, and otherwise the remainder of the second embodiment is the same as the preferred embodiment. The disclosure of U.S. Pat. No. 3,195,898, issued on Jul. 20, 1965 to Respini is incorporated herein in its entirety, particularly with respect to the stake assembly of FIG. 2 therein; however, the angle of the stem 30 relative to the ground penetrating leg 24 within the plane of the stake assembly 6 of Respini would not be suitable for the present second embodiment combination. For use in the garden memorial arch of the present second embodiment, the stake assemblies would each lie in a single plane and when they are assembled the planes of the two stake assemblies are parallel and spaced apart. The two identical ground penetarating stake assemblies of the second embodiment are cast or molded from metal or plastic in one homogeneous piece. The upwardly extending connector is a solid rod, which is irregularly shaped, polygonal and/or rounded in cross-section, to be telescopically assembled within the flexible tube 6, 7, 9 or 10.

In contrast to the first and second embodiments that have the two planes of the stake assemblies parallel and spaced apart as seen by comparing the present inventor's FIGS. 1 and 2, Respini has the ground stakes in a single plane in the net supporting arrangement. The embodiment parallel spaced apart planes of the present embodiments provide front to back bracing for stability, for example to resist a high wind load when the attached floral arrangement of FIG. 5 provides considerable wind resistance to a cross wind and at the same time the floral arrangement lies in a symetrical vertical plane. In contrast, it is important to Respini to tension the net, and placing the stakes in parallel spaced apart planes would cause the net to lean and be unsuitable for Respini's intended use. Stability for long unattended use in the open is an important design aspect of the present invention.

Therefore, the stake assemblies of the embodiment provide front to back bracing for the arch assembly.

The stake assemblies are driven into the ground without requiring any tools, simply by placing a foot upon the brace portion 3 and transfering weight onto the brace portion 3 to drive the stake portions 1 into the ground. Therefor, no hammer or other implement is needed and the arch may be installed, as in FIG. 5, by a general member of the public without instructions or special skill being required, although they may be helpful.

A further advantage is that the brace portion 3 presents a horizontal surface to the ground that will upon contact with the ground greatly increase resistance to further ground penetration. This feature may well be appreciated by anyone who has tried to drive a single stake, pipe, or the like into the ground and found that it is almost impossible to drive the stake vertically, requiring subsequent adjustment attempts. With the present invention, the spaced apart stake portions 1 and 5 will assure that the brace portion is horizontal before driving is started, and if the stake portions stray from vertical during driving, the brace portion will first engage the ground at the low end and cause the assembly to correct alignment. Therefore vertical alignment in one vertical plane is self compensating and such one plane is the plane that is parallel to the plane of the eyes of the installer when the installer's foot is on the brace portion 3 and thus most difficult for the installer to judge vertical alignment therein.

The stake portions 1 and 5 are not seen in FIG. 5, because they are within the ground. While the brace portion 3 is seen in FIG. 5, the brace portion 3 may easily be driven further into the ground so that its top surface is flush with the ground or at least under blades of grass or the like to be visually hidden. Thus, the benefits of the brace portion are obtained without aesthetically obscuring the effect of the arch.

The arch assembly 7–10 is an at least two dimensional flower holding portion having two connection ends, respectively connected to complementary connection ends of first and second stake assemblies 1–5, respectively. The arch assembly 7–10 is preferably of elongated material that has an elastic deformation, or flexibility, that is sufficent for it to be bendable from an unstressed straight linear aspect to an arcuate installed aspect. The arcuate aspect or mode is particularly one that encompasses a semicircle provided by a uniform one hundred eighty degree elastic deformation or bend. The elasticity is preferably such that the arch assembly, when removed from use in its arcuate aspect, after an indefinitely long period of time, will assume an unstressed return aspect that is substantialy the same as the begining unstressed straight linear aspect, that is without substantial permanent deformation.

The arch assembly 7–10 may be only a single elongated homogeneous structure, such as a single homogeneous and constant cross-section tubular or solic rod. Preferably, the arch assembly 7–10 comprises a plurality of single elongated homogeneous structures 6, 7, 9, 10 that may be connected together in tandem. By providing a plurality of single elongated homogeneous structures 6, 7, 9, 10, packaging of the memorial arch is facilitated, because the length of such a package, not shown, is thereby reduced, as shown with the laid out complete kit of parts as shown in FIG. 7.

The plurality of single elongated homogeneous structures 6, 7, 9, 10 are preferably of two or more, three being illustrated, different lengths, so that different combinations of less than all of the plurality of single elongated homogeneous structures 6, 7, 9, 10 may be assembled to obtain a plurality of different length arch assemblies, as desired, for example to accomodate different style and size memorials 13. In FIG. 5, the relative proportions of the memorial garden arch and the memorial 13 may be pleasing to the eye of the installer, but if the memorial 13 were smaller, for example of less height, the installer may find it more pleasing to leave out one or more of the plurality of single elongated homogeneous structures 6, 7, 9, 10 to obtain a garden memorial arch of more appropriate size. Thus inventory of different size garden memorial arches is avoided, because, for example, one kit of parts may be used to construct different size arch assemblies and furthermore, the packaging is optimized to be smaller.

The plurality of single elongated homogeneous structures 6, 7, 9, 10, in the embodiment are fiberglas tubes and they are connected together by telescoping connectors 8. The connectors 8 are preferably all identical and comprise short tubes, preferably thin walled aluminum. The tubes 8 are of an internal diameter substantialy equal to or larger than the external diamenter of the plurality of single elongated homogeneous structures 6, 7, 9, 10 to provide a telescoping connection that requires no tools or suplimental securement.

Most preferably, at the mid-portion of each tube 8, two or more dimples 12 are provided, two diametrically opposed dimples 12 being shown. The dimples 12 are abutments that will limit the insertion of the plurality of single elongated homogeneous structures 6, 7, 9, 10 to substantially one-half or less of the length of the connectors 8. For this purpose, the number and size of the dimples are most preferably selected so that further insertion of the plurality of single elongated homogeneous structures 6, 7, 9, 10 past the one-half way point would be impossible manually or at least sufficiently more difficult that one would clearly know to stop the insertion process, taking into consideration the strength range and taking into consideration the sensitivity of different expected installers and the deformability of the plurality of single elongated homogeneous structures 6, 7, 9, 10 and dimples 12.

The connectors 8 are further enhanced by the provision of dimples 11 respectively between the dimples 12 and the terminal ends of each connector 8. The number of dimples 11 between the dimples 12 and a terminal end is preferably less than the number of dimples 12, as shown in the drawing wherein there is one such dimple ii, and/or the the dimples 11 may be of less extent or otherwise such that the resistance to insertion of the plurality of single elongated homogeneous structures 6, 7, 9, 10 into the connectors 8 afforded by the dimples 11 is sufficiently less than the resistance to insertion of the plurality of single elongated homogeneous structures 6, 7, 9, 10 past the dimples 12 so that the former is easily exceeded and the latter sufficiently difficult that insertion is ended when the dimples 12 are encountered.

The dimples 11 and 12, although not necessary, are advantageous. The dimples 11 will resist accidental dissassembly of the memorial garden arch. The dimples 12, although not necessary, will resist uneven and inadequate assembly of the memorial garden arch.

The arch assembly 5–10 is connected to the two stake assemblies 1–5 by telescopically connecting the terminal ends of the arch assembly into the connection ends of the tubular steel connectors 4, respectively. The stake portion 5 extends into the tubular steel connector 4 for about one-half the length of the tubular steel connector 4, and thereby limits the insertion of the terminal ends of the arch assembly to about one-half the length of the tubular steel connector 4.

The internal diameter of the tubular steel connector 4 is substantialy equal to or smaller than the external diameter of the tubes 6, 7, 9, and 10. The external diameters of the tubes 6, 7, 9, and 10 are substantially equal to each other and substantially equal to the external diameter of the rods forming the stake portions 1 and 5.

The tube 4 may be square or round, as may the tubes 6, 7, 8, 9, and 10, as may be the rods of the portions 1, 3, and 5. Some tubes and rods may be circular while others are square, so long as they have corresponding dimensions to facilitate assembly. With molded components, such as the stake assembly of the Respini patent, other cross-sectional shapes may be employed.

The embodiment material for the tubes 6, 7, 9, 10 is tubular fiberglas, but other materials such as high tension aluminum may be used if the elasticity and flexibility are sufficient as previously explained. The embodiment material for the connectors 8 is preferably aluminum, but other materials may be used, such as synthetic extruded or molded plastic.

Instead of the welding 14 and 15 as shown in FIG. 8, which is suitable for plastic or metal when defining welding to include heat or cold pressure or chemical types of fusion, other means may be used, such as adhesive or friction such as that afforded by an interference fit.

The floral material 16, as shown in FIG. 5, may be natural and/or sythetic, and include flowers and/or leaves. The flora are connected to the arch assembly 6–10 by any suitable means such as string, wire, wrapping, twisting, or the like. Additional flora attaching structure may be present, such as the wreath holding prongs of the U.S. patents to Bowers et al, U.S. Pat. No. 3,136,510 issued Jun. 9, 1964 and Roach et al, U.S. Pat. No. 1,958,716, or the serpentine wire of the U.S. Design patent to Thompson, U.S. Pat. No. Des. 158,627.

While the present invention has been described in connection with a number of embodiments, details, implementations, modifications and variations that have advantages specific to them, the present invention is not necessarily so limited but covers various obvious modifications and equivalent arrangements according to the broader aspects, which fall within the spirit and scope of the following claims.

What is claimed is:

1. A garden memorial flower holder, comprising:
   first and second ground penetrating stake assemblies, each having a ground penetrating terminal lower end and an opposite upper connection end;
   a flower holding assembly having two connection opposed ends, respectively connectable to said first and second ground penetrating stake assemblies;
   said flower holding assembly comprising at least two connections and at least three rods of at least two different lengths connected in tandem by said two connections, so that said rods when used alone and connected in different combinations provide at least five different arch assembly lengths; and
   said rods having sufficient flexibility, when connected in tandem, to elastically deform from an unstressed straight linear aspect to an arcuate aspect encompassing a semi-circular arch configuration from one of said two connection opposed ends to the other of said two connection opposed ends without permanent deformation.

2. The garden memorial flower holder, according to claim 1, wherein:
each of said two connections and said plurality of rods telescopiclly interconnect.

3. The garden memorial flower holder, according to claim 2, wherein:
each of said two connections has abutments engaging ends of said rods sufficiently to limit telescopic overlapping; and
each of said two connections has friction detents engaging outer walls of said rods sufficiently to resist disconnection.

4. A garden memorial flower holder arch, comprising:
a first vertical, ground penetrating, stake portion having a terminal lower end and an opposite upper connection end;
a first horizontal brace portion having a first connection end connected to said upper connection end of said first vertical stake portion and further having a second vertically extending connection end;
a second vertical, ground penetrating, stake portion having a terminal lower end and an opposite connection end;
a second horizontal brace portion having a first connection end connected to said upper connection end of said second vertical stake portion and further having a second vertically extending connection end;
a flower holding rod portion having two connection opposed vertically extending ends, respectively connectable to said second connection vertically extending ends of said first and second horizontal brace portions, said flower holding rod portion having sufficient flexibility to elastically deform from an unstressed straight linear aspect to an arcuate aspect encompassing a semi-circular arch configuration from one of said two connection ends to the other of said two connection ends, without permanent deformation;
whereby the first and second horizontal brace portions are adapted to be engaged by foot to force the corresponding ground penetrating, stake portion into a cemetery ground, and whereby the first and second horizontal brace portions are adapted to engage the ground to limit the penetration of the corresponding stake portions, and whereby the first and second horizontal brace portions are adapted to engage the ground to vertically align the first and second stake portions and stabilize the flower holding portion;
third and fourth vertical, ground penetrating, stake portions having terminal lower ends and opposite upper connection ends respectively connected to said second vertically extending connection ends of said first and second brace portions, and said third and fourth stake portions being parallel to and spaced from respective ones of said first and second stake portions;
one of said two connection opposed ends of said flower holding portion being respectively connectable to said second vertically extending connection ends of said first horizontal brace portion so said first horizontal brace portion, said first stake portion and said third stake portion extend substantially completely in a first vertical plane;
the other of said two connection opposed ends of said flower holding portion being respectively connectable to said second vertically extending connection ends of said second horizontal brace portion so that said second horizontal brace portion, said second stake portion and said fourth stake portion extend substantially completely in a second vertical plane parallel to and spaced from said first vertical plane; and
said first and second vertical planes are perpendicular to said flower holding portion.

5. The garden memorial flower holder, according to claim 4, wherein when assembled:
said flower holding portion is symetrical with respect to a third vertical plane parallel to and mid-way between said first and second vertical planes; and
said flower holding is symetrical with respect to a fourth vertical plane perpendicular to said first, second and third vertical planes.

6. The garden memorial flower holder, according to claim 5, further comprising:
a first connection telescopically overlapping an adjacent upper connection end of said third stake portion with an adjacent one of said connection opposed ends of said flower holding portion; and
a second connection telescopically overlapping an adjacent upper connection end of said fourth stake portion with an adjacent other of said connection opposed ends of said flower holding portion.

7. The garden memorial flower holder, according to claim 6, wherein:
said flower holding portion comprises a plurality of rods and a third connection telescopically connected said rods in tandem.

8. The garden memorial flower holder, according to claim 7, wherein:
said third connection has dimples extending inwardly as abutments engaging ends of said rods sufficiently to limit telescopic overlapping; and
said third connection has dimples extending inwardly as friction detents engaging outer walls of said rods sufficiently to resist disassembly.

9. The garden memorial flower holder, according to claim 8, wherein:
said first, second and third connections are releasable.

10. A garden memorial flower holder arch, comprising:
a first vertical, ground penetrating, stake portion having a terminal lower end and an opposite upper connection end;
a first horizontal brace portion having a first connection end connected to said upper connection end of said first vertical stake portion and further having a second vertically extending connection end;
a second vertical, ground penetrating, stake portion having a terminal lower end and an opposite connection end;
a second horizontal brace portion having a first connection end connected to said upper connection end of said second vertical stake portion and further having a second vertically extending connection end;
a flower holding rod portion having two connection opposed vertically extending ends, respectively connectable to said second connection vertically extending ends of said first and second horizontal brace portions, said flower holding rod portion having sufficient flexibility to elastically deform from an unstressed straight linear aspect to an arcuate aspect encompassing a semi-circular arch configuration from one of said two connection ends to the other of said two connection ends, without permanent deformation;

whereby the first and second horizontal brace portions are adapted to be engaged by foot to force the corresponding around penetrating, stake portion into a cemetery ground, and whereby the first and second horizontal brace portions are adapted to engage the ground to limit the penetration of the corresponding stake portions, and whereby the first and second horizontal brace portions are adapted to engage the ground to vertically align the first and second stake portions and stabilize the flower holding portion;

said flower holding portion comprises a plurality of separate rods and at least one rod connection telescopically connecting said rods in tandem;

said rod connection having abutments engaging ends of said rods sufficiently to limit telescopic overlapping;

said rod connection further having friction detents engaging outer walls of said rods sufficiently to resist disconnecting said rods; and said rod connection being releasable.

11. A garden memorial flower holder arch, comprising:

a first vertical, ground penetrating, stake portion having a terminal lower end and an opposite upper connection end;

a first horizontal brace portion having a first connection end connected to said upper connection end of said first vertical stake portion and further having a second vertically extending connection end;

a second vertical, ground penetrating, stake portion having a terminal lower end and an opposite connection end;

a second horizontal brace portion having a first connection end connected to said upper connection end of said second vertical stake portion and further having a second vertically extending connection end;

a flower holding rod portion having two connection opposed vertically extending ends, respectively connectable to said second connection vertically extending ends of said first and second horizontal brace portions, said flower holding rod portion having sufficient flexibility to elastically deform from an unstressed straight linear aspect to an arcuate aspect encompassing a semi-circular arch configuration from one of said two connection ends to the other of said two connection ends, without permanent deformation;

whereby the first and second horizontal brace portions are adapted to be engaged by foot to force the corresponding ground penetrating, stake portion into a cemetery ground, and whereby the first and second horizontal brace portions are adapted to engage the ground to limit the penetration of the corresponding stake portions, and whereby the first and second horizontal brace portions are adapted to engage the ground to vertically align the first and second stake portions and stabilize the flower holding portion; and said flower holding rod portion comprising at least two connections and at least three rods of at least two different lengths connected in tandem by said two connections, so that said rods when used alone and connected in different combinations provide at least five different arch assembly lengths.

* * * * *